(12) United States Patent
Noh et al.

(10) Patent No.: US 9,168,955 B2
(45) Date of Patent: Oct. 27, 2015

(54) SMART PARKING ASSIST SYSTEM OF VEHICLE AND CONTROL METHOD THEREOF

(71) Applicant: MANDO CORPORATION, Pyeongtaek-si (KR)

(72) Inventors: Tae Bong Noh, Yongin-si (KR); Jae Suk Kim, Yongin-si (KR)

(73) Assignee: MANDO CORPORATION, Pyeongtaek-Si (KR)

( * ) Notice: Subject to any disclaimer, the term of this patent is extended or adjusted under 35 U.S.C. 154(b) by 0 days.

(21) Appl. No.: 13/848,686

(22) Filed: Mar. 21, 2013

(65) Prior Publication Data

US 2013/0289825 A1 Oct. 31, 2013

(30) Foreign Application Priority Data

Mar. 21, 2012 (KR) .................. 10-2012-0028626

(51) Int. Cl.
 *B62D 6/00* (2006.01)
 *B60Q 1/48* (2006.01)
 *B62D 15/02* (2006.01)

(52) U.S. Cl.
 CPC .......... *B62D 15/0285* (2013.01); *B62D 15/027* (2013.01)

(58) Field of Classification Search
 USPC ....................................................... 701/42
 See application file for complete search history.

(56) References Cited

U.S. PATENT DOCUMENTS 8,056,667 B2 * 11/2011 Moshchuk et al. ........... 180/169
8,095,273 B2 * 1/2012 Moshchuk et al. ............. 701/41
8,289,189 B2 * 10/2012 Becker et al. ............... 340/932.2
8,299,941 B2 * 10/2012 Faber ........................ 340/932.2
8,319,663 B2 * 11/2012 Von Reyher et al. ...... 340/932.2

(Continued)

FOREIGN PATENT DOCUMENTS

DE        10 2005 046 827         4/2006
DE            102009025328 A1 *  12/2010   ............. B62D 15/02

(Continued)

OTHER PUBLICATIONS

Office Action dated Apr. 15, 2014 for corresponding Korean Patent Application No. 10-2012-0028626.

(Continued)

*Primary Examiner* — Thomas G Black
*Assistant Examiner* — Tyler Paige
(74) *Attorney, Agent, or Firm* — Ladas & Parry, LLP

(57) ABSTRACT

Disclosed herein are a parking assist system to park a vehicle at the center of a target position in parking of the vehicle at the target position and a control method thereof.

A control method of a parking assist system including a state sensor to sense a state of a vehicle, an obstacle sensor to sense obstacles present at a front side, a rear side or lateral sides of the vehicle, and an interface to provide a driver with information about a state or operation of the vehicle includes computing a parking path for the vehicle based on results of sensing by the state sensor and the obstacle sensor, controlling steering of the vehicle such that the vehicle is parked at a target position along the computed parking path, and when the vehicle reaches the target position, controlling steering of the vehicle to position the vehicle at a center of the target position based on information related to situations at the front and rear sides of the vehicle sensed by the obstacle sensor.

9 Claims, 6 Drawing Sheets

(56) References Cited

U.S. PATENT DOCUMENTS

| | | | |
|---|---|---|---|
| 2001/0027363 A1 | 10/2001 | Shimazaki | |
| 2007/0282503 A1* | 12/2007 | Luke | 701/44 |
| 2010/0228417 A1* | 9/2010 | Lee et al. | 701/23 |

FOREIGN PATENT DOCUMENTS

| | | |
|---|---|---|
| EP | 1 690 777 | 8/2006 |
| FR | 2 785 383 | 5/2000 |
| JP | 2010-100086 | 5/2010 |
| JP | 2012-51487 | 3/2012 |

OTHER PUBLICATIONS

Office Action dated Oct. 24, 2014 for German Patent Application No. 10 2013 005 302.1 and its English summary provided by Applicant's foreign counsel.

* cited by examiner

SMART PARKING ASSIST SYSTEM OF VEHICLE AND CONTROL METHOD THEREOF

CROSS-REFERENCE TO RELATED APPLICATION(S)

This application claims priority to Korean Patent Application No. 10-2012-0028626, filed on Mar. 21, 2012 in the Korean Intellectual Property Office, the disclosure of which is incorporated herein by reference in its entirety.

BACKGROUND

1. Field

Embodiments of the present invention relate to a parking assist system that automatically controls steering of a vehicle to a parking spot to assist parking of the vehicle and a control method thereof.

2. Description of the Related Art

When parking a vehicle, a driver usually moves the vehicle, observing obstacles on the lateral sides and rear side of the vehicle through the side mirrors and the rear-view mirror which are mounted on the vehicle.

However, a blind spot that is seldom recognized by the driver is formed around the rear corners of the vehicle, and even when the driver recognizes an obstacle, failure to identify the correct length and width of the vehicle may lead to failure of recognition of the distance between the vehicle and the obstacle, thereby resulting in contact of the vehicle with the obstacle.

To address this disadvantage, a parking assist system (PAS) has been introduced, which assists the driver in recognition of the distance of the vehicle from an obstacle using sensors mounted to the front and rear of the vehicle. Also, a smart parking assist system (SPAS) has recently been introduced which recognizes a parking spot and automatically generates a parking path to automatically control the steering wheels and park the vehicle without requiring driver manipulation of the steering wheel. The SPAS is also referred to as a parking steering assist system since it controls steering of the vehicle.

The PAS receives, from various sensors mounted to the vehicle, a vehicular speed, side sensor information, a wheel pulse indicating a travel distance of a wheel and a signal of a steering angle sensor to recognize the parking space and perform path control.

However, the system as above may fail to park the vehicle at the center of the parking space, and rather complete the parking with the vehicle positioned closer to a front vehicle or rear vehicle. If parking is completed with the vehicle positioned closer to the front vehicle, the driver may need to unnecessarily adjust the position of the vehicle when leaving the parking spot. On the other hand, if parking is completed with the vehicle positioned closer to the rear vehicle, a sufficient space may not be secured in loading/unloading the trunk.

SUMMARY

Therefore, it is an aspect of the present invention to provide a parking assist system to park a vehicle at the center of a target position in parking of the vehicle at the target position and a control method thereof.

Additional aspects of the invention will be set forth in part in the description which follows and, in part, will be obvious from the description, or may be learned by practice of the invention.

In accordance with one aspect of the present invention, a parking assist system includes a state sensor to sense a state of a vehicle, an obstacle sensor to sense obstacles present at a front side, a rear side or lateral sides of the vehicle, an interface to provide a driver with information about a state or operation of the vehicle, and a controller to compute a parking path for the vehicle based on results of sensing by the state sensor and the obstacle sensor, control steering of the vehicle such that the vehicle is parked at a target position along the computed parking path, and announce, to the driver, manipulations required during parking of the vehicle at the target position, through the interface, wherein, when the vehicle reaches the target position, the controller controls steering of the vehicle to position the vehicle at a center of the target position, based on information related to situations at the front and rear sides of the vehicle sensed by the obstacle sensor.

When the vehicle reaches the target position, the controller may turn a steering wheel of the vehicle back to an original position thereof, calculate distances between the vehicle and the obstacles positioned at the front side and the rear side of the vehicle based on the result of sensing by the obstacle sensor when the steering wheel is turned back to the original position, determine whether the vehicle is off the center of the target position based on the calculated distances, and control steering of the vehicle to position the vehicle at the center of the target position if the vehicle is off the center of the target position.

If the distance between the vehicle and one obstacle positioned at the front side of the vehicle is different from the distance between the vehicle and another obstacle positioned at the rear side of the vehicle, the controller may determine that the vehicle is off the center of the target position.

When controlling steering of the vehicle to position the vehicle at the center of the target position, the controller may guide the driver to perform shift to a forward or reverse gear through the interface.

The state sensor may include at least one of a steering angle sensor to sense a steering angle of the vehicle, a gear position sensor to sense a position of a gear, a wheel speed sensor to sense a wheel speed of the vehicle, and a vehicular speed sensor to sense a speed of the vehicle.

The obstacle sensor may include an ultrasonic sensor to sense distances to the obstacles.

In accordance with another aspect of the present invention, a control method of a parking assist system including a state sensor to sense a state of a vehicle, an obstacle sensor to sense obstacles present at a front side, a rear side or lateral sides of the vehicle, and an interface to provide a driver with information about a state or operation of the vehicle includes computing a parking path for the vehicle based on results of sensing by the state sensor and the obstacle sensor, controlling steering of the vehicle such that the vehicle is parked at a target position along the computed parking path, and when the vehicle reaches the target position, controlling steering of the vehicle to position the vehicle at a center of the target position based on information related to situations at the front and rear sides of the vehicle sensed by the obstacle sensor.

The controlling based on the information related to the situations at the front and rear sides of the vehicle may include when the vehicle reaches the target position, turning a steering wheel of the vehicle back to an original position thereof, when the steering wheel is turned back to the original position, calculating distances between the vehicle and the obstacles positioned at the front side and the rear side of the vehicle based on the result of sensing by the obstacle sensor, determining whether the vehicle is off the center of the target position based on the calculated distances, and if the vehicle is off the center of the target position, controlling steering of the vehicle to position the vehicle at the center of the target position.

The determining may include determining that the vehicle is off the center of the target position if the distance between the vehicle and one obstacle positioned at the front side of the vehicle is different from the distance between the vehicle and another obstacle positioned at the rear side of the vehicle.

The control method may further include guiding the driver to perform shift to a forward or reverse gear through the interface, while controlling steering of the vehicle to position the vehicle at the center of the target position.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
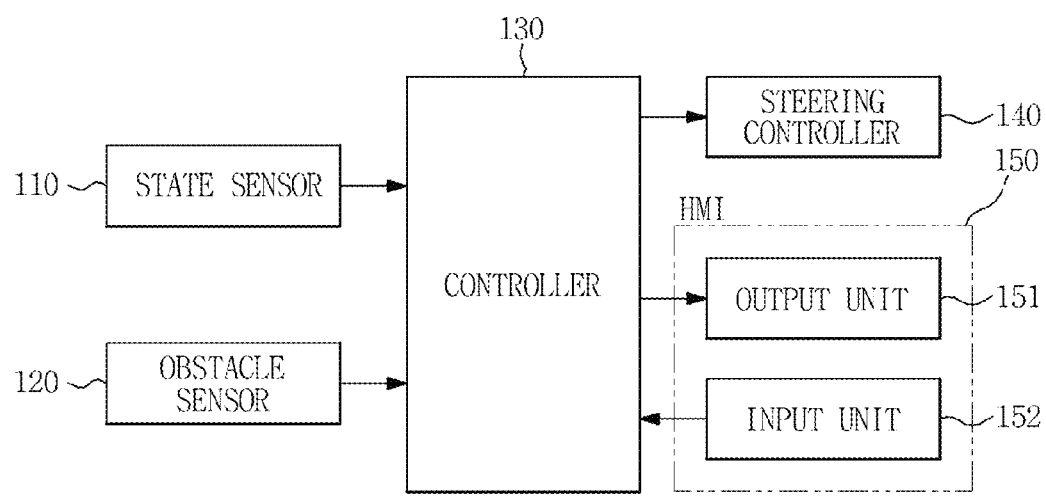
FIG. 1 is a control block diagram showing the configuration of a parking assist system according to an exemplary embodiment of the present invention.

Reference will now be made in detail to the embodiments of the present invention, examples of which are illustrated in the accompanying drawings, wherein like reference numerals refer to like elements throughout.

FIG. 1 is a control block diagram showing the configuration of a parking assist system according to an exemplary embodiment of the present invention.

Referring to FIG. 1, the parking assist system 100 according to the illustrated embodiment includes a state sensor 110 to sense the state of a vehicle 10, an obstacle sensor 120 to sense obstacles around the vehicle 10, a controller 130 to set a parking path and perform computation of a steering angle based on the sensing results from the state sensor 110 and the obstacle sensor 120, a steering controller 140 to automatically control a steering wheel of the vehicle 10, and an interface 150 to receive details for parking assist from a driver or output the same to the driver.

The state sensor 110, which serves to sense the current state of the vehicle 10, may include at least one of an axle angle sensor to sense an axle angle, a steering angle sensor to sense a steering angle of the vehicle 10, a gear position sensor to sense a position of a gear, a wheel speed sensor to sense a wheel speed of the vehicle 10, and a vehicular speed sensor to sense a speed of the vehicle.

The obstacle sensor 120 serves to recognize obstacles near the vehicle 10 and sense the distance between the vehicle 10 and the obstacles, and an ultrasonic sensor may be employed as the obstacle sensor 120. The ultrasonic sensor may be mounted to a front edge, a rear edge or a lateral side of the vehicle 10 and used to detect a distance of the vehicle 10 from an obstacle and recognize a parking space.

The state sensor 110 and the obstacle sensor 120 sense the situations of the vehicle 10 and transmit sensor signals to the controller 130.

As the steering controller 140 which is a steering assist member to identify the driving situation of the vehicle 10 and a driver's intention and actively assist steering of the vehicle 10, an electronic power steering (EPS) system, a motor-driven power steering (MDPS) system, or an active front steering (AFS) system may be applied. In the illustrated embodiment, the steering controller 140 steers the vehicle 10 under control of the controller 130.

The interface 150, which is generally referred to as a human machine interface (HMI), an output unit 151 to visually or audibly inform the driver of the current state of the vehicle 10 or the requirements for automatic parking, and an input unit 152 allowing the driver to select parking by automatic steering therethrough. The output unit 151 includes a speaker to output a sound or a display to output a visual screen thereon, while the input unit 152 includes a switch. In case that the display has a touchscreen, the touch panel may serves as the input unit. In addition, when the HMI is adapted to recognize voice, a microphone to receive voice from the driver may serve as the input unit. The configuration of the interface 150 is not limited to the illustrated embodiment. The interface may be configured with various components.

Figure 2:
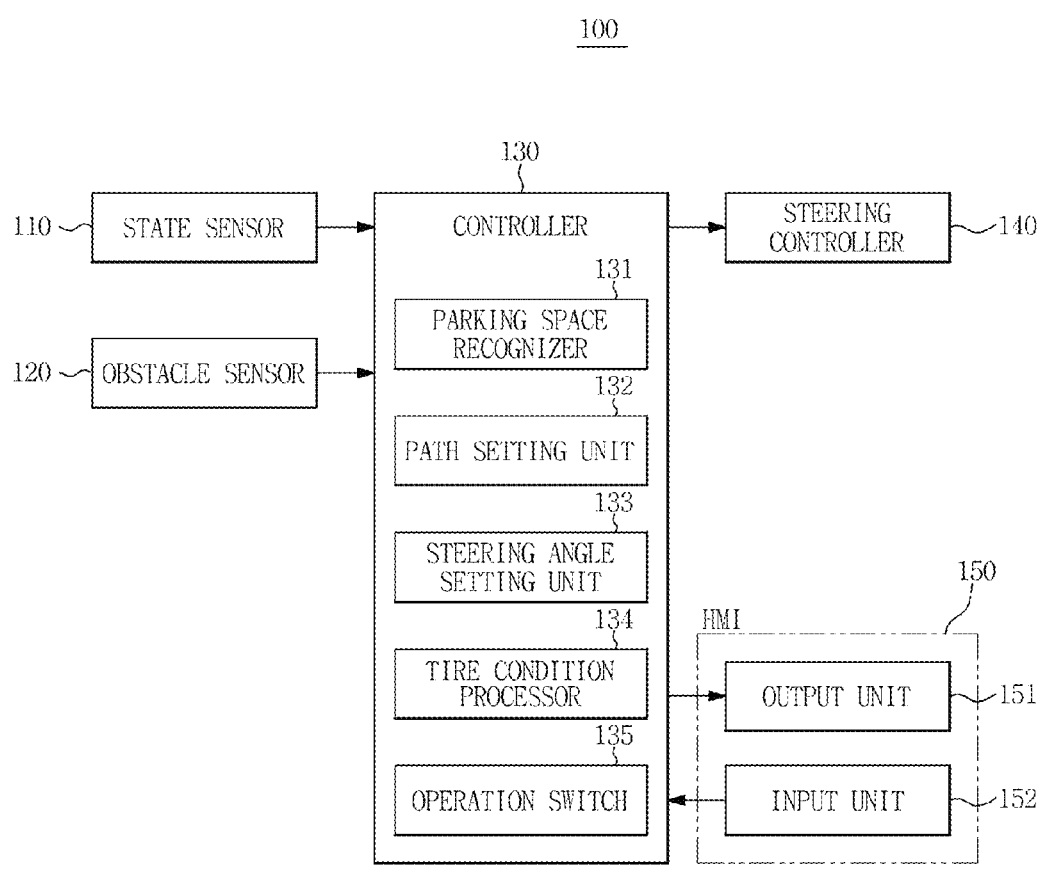
FIG. 2 is a control block diagram showing, in detail, the functions of the controller of the parking assist system according to the embodiment of the present invention.
Figure 3:
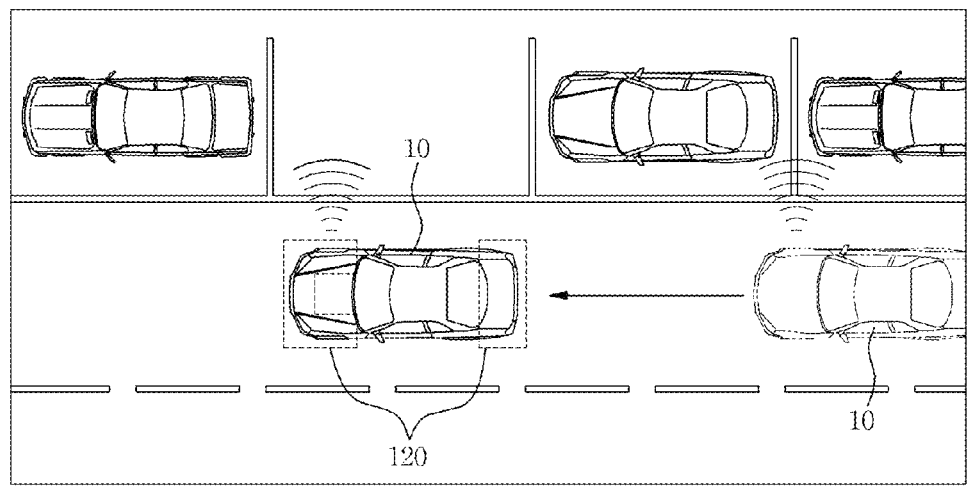
FIG. 3 is a view illustrating a vehicle that searches for a parking space using the parking assist system according to the embodiment of the present invention.
Figure 4:
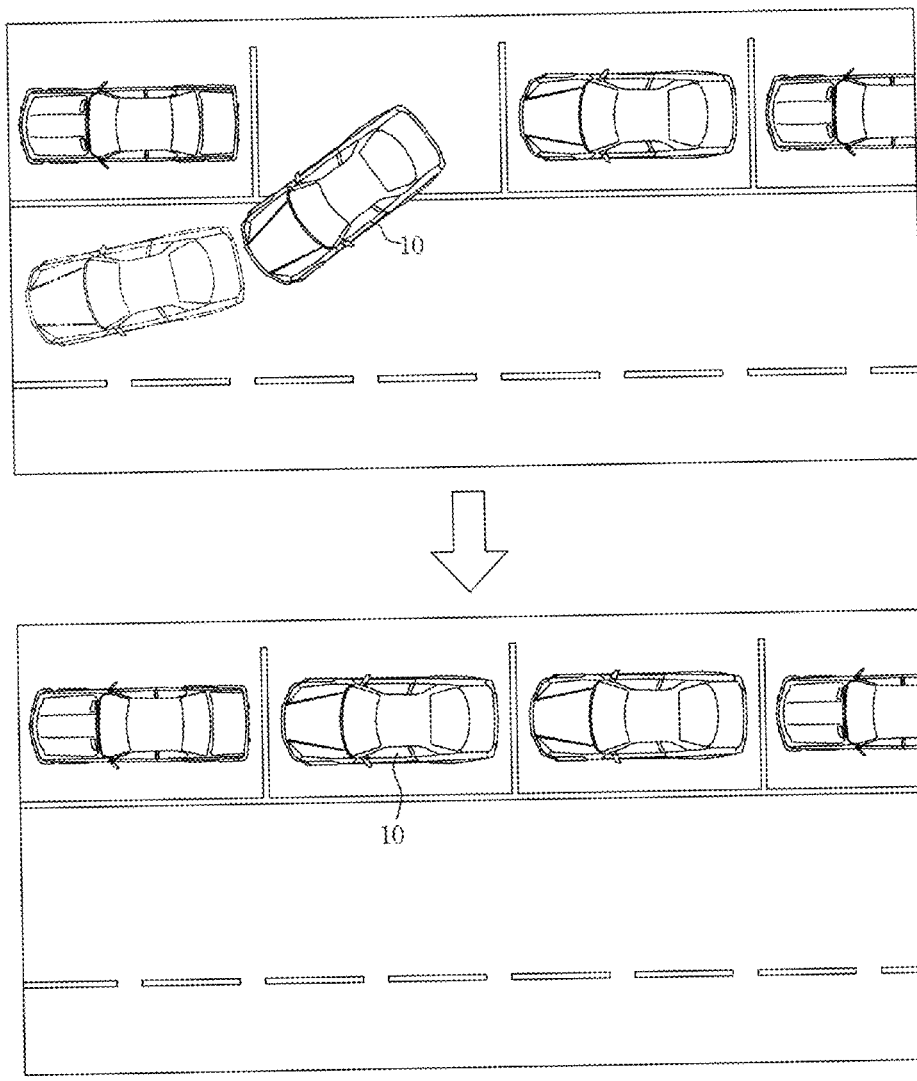
FIG. 4 is a view illustrating the vehicle that performs parallel parking using the parking assist system according to the embodiment of the present invention.

FIG. 2 is a control block diagram showing, in detail, the functions of the controller 130 of the parking assist system 100 according to the illustrated embodiment of the present invention. FIG. 3 is a view illustrating a vehicle 10 that searches for a parking space using the parking assist system 100 according to the embodiment of the present invention, and FIG. 4 is a view illustrating the vehicle 10 that performs parallel parking using the parking assist system 100 according to the embodiment of the present invention.

Hereinafter, operation of the controller 130 will be described in detail with reference to FIGS. 2 to 4.

Referring to FIG. 2, the controller 130 of the parking assist system 100 according to the illustrated embodiment of the present invention includes a parking space recognizer 131 to recognize a parking space based on the sensed results from the obstacle sensor 120, a path setting unit 132 to set a parking path to park in the recognized parking space, a steering angle setting unit 133 to calculate a steering angle to move the vehicle 10 according to the set path, and an operation switch 135 to turn on/off the parking assist system.

When a user selects parking through the parking assist system 100, i.e., parking by automatic, steering through the interface 150, the operation switch 135 turns on the parking assist system 100, and then the vehicle 10 having the parking assist system 100 performs search for a parking space using the obstacle sensor 120 as shown in FIG. 3. At this time, the parking space recognizer 131 measures the width and depth of the parking space and determines whether the space is suitable for the vehicle 10 to be parked therein.

The user is also allowed to select between perpendicular parking and parallel parking through the interface 150. In the illustrated embodiment, it is assumed that the user selects parallel parking.

When a space to park the vehicle 10 is recognized by the parking space recognizer 131, the path setting unit 132 sets a path from the current position of the vehicle 10 to the recognized parking space to park therein. In the illustrated embodiment, using the coordinates of the parking start point, the coordinates of the two corners of the entrance of the parking space, the width and depth of the parking space, the coordinates of the parking target points for the vehicle 10 are calculated. Then a path is set such that the vehicle 10 moves from the coordinates of the parking start point to the coordinates of the parking target point.

The steering angle setting unit 133 calculates and sets a steering angle to move the vehicle 10 along the path set by the path setting unit 132.

The path setting unit 132 and the steering angle setting unit 133 set the path and the steering angle based on the position of and distance from an obstacle sensed by the obstacle sensor 120.

The parking assist system usually serves to automatically control the steering wheel of the vehicle 10, and allows the driver to directly perform shift between forward gear and the reverse gear. Braking the vehicle 10 may be implemented when the user pushes the pedal. In the illustrated embodiment, decelerating or braking the vehicle 10 may also be implemented in connection with an electronic brake system even when the driver does not push the pedal. As the electronic brake system, an anti-lock brake system (ABS), an automatic stability control (ASC) system or a dynamic stability control (DSC) system may be employed.

Hereinafter, a procedure of parking through the automatic steering will be described with reference to FIG. 4. In the illustrated embodiment, it is assumed that braking is performed by the force applied to the pedal by the driver, not in connection with the electronic brake system.

When a parking space to park the vehicle 10 is recognized, shift to the reverse gear is guided through the interface 150. A message guiding the shift to the reverse gear may be displayed on the display, or a voice message or an alarm sound corresponding to the shift to the reverse gear may be output through a speaker.

When the shift to the reverse gear is made by the driver, the steering controller 140 automatically controls the steering wheel to adjust the direction of movement of the vehicle 10. At this time, the driver is guided through the output unit 151 to apply force to the pedal to slowly back up the vehicle 10.

In case of parallel parking, parking is often performed by switching to reverse, to forward and again to reverse in contrast with the case of parking by backing-in. In this case, a message is output through the output unit 151 to guide the driver to apply force to the pedal and perform shift to the forward gear.

As such, the controller 130 sends a signal to the steering controller 140 to control steering of the vehicle 10 such that the vehicle 10 moves along a set path, and the driver shifts the gear and pushes the pedal according to a message output through the output unit 151. In another embodiment in which the PAS is adapted to operate in connection with an electronic brake system, decelerating or braking the vehicle may be implemented even when the pedal is not pushed by the driver.

When parking of the vehicle 10 is completed, a message to announce completion of parking is output through the output unit, and the operation switch 135 may automatically turn off the parking assist system 100 or may turn off the parking assist system 100 according to a command from the driver through the input unit 152.

To move the vehicle 10 according to the set parking path and steering angle, it is needed to identify the current state of the vehicle 10 using the sensed result from the state sensor 110. Specifically, the amount of movement of the vehicle may be identified using a value of a wheel speed sensor, and time to shift the gear may be determined according to the amount of movement of the vehicle 10. In addition, a control value required to reach a set steering angle may be determined using the value from the steering angle sensor, and whether to push the pedal may be determined using a value from the vehicular speed sensor. In addition, whether gear shift needs to be performed or has been normally performed may be determined using a value from a gear position sensor.

Figure 5:
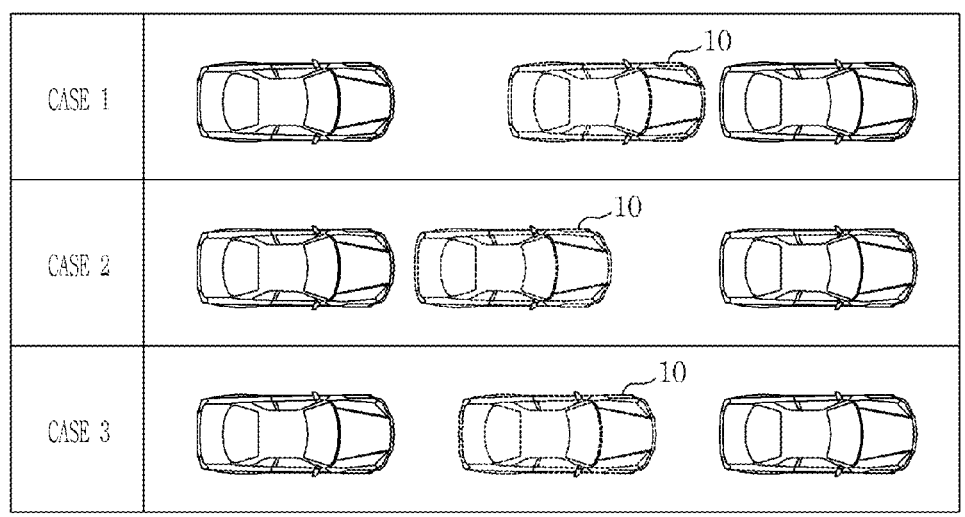
FIG. 5 is a view illustrating the parking state of the vehicle.

FIG. 5 is a view illustrating the parking state of the vehicle 10.

As shown in FIG. 5, when the vehicle 10 is parked in the target position, parking may be completed with the vehicle 10 being positioned closer to a vehicle at the front or rear side of the vehicle 10 as shown in CASEs 1 and 2, rather than being positioned at the center of the target position.

If parking is completed with the vehicle 10 placed closer to a vehicle at the front thereof as shown in CASE 1, the driver may need to unnecessarily adjust the position of the vehicle when leaving the parking space. If parking is completed with the vehicle 10 positioned closer to a vehicle at the rear side thereof, a space needed to load the trunk may not be secured as in CASE 2.

To make sure that the vehicle 10 is parked at the center of the target position, the parking assist system according to the illustrated embodiment of the present invention checks if the vehicle 10 is at the center of the target position when parking is completed. If the vehicle 10 is not at the center of the target position, the parking assist system performs additional control to place the vehicle 10 at the center of the target position.

When the vehicle 10 reaches the target position, the controller 130 first turns the steering wheel of the vehicle 10 back to its original position. If the vehicle 10 is moved forward or backward with the steering wheel turned to one side, it may be placed closer to one side when parked.

Once the steering wheel is turned back to its original position, the controller 130 calculates the distance between the vehicle 10 and obstacles (e.g., vehicles) positioned at the front side and rear side of the vehicle according to the sensed result from the obstacle sensor 120, and determines whether the vehicle is off the center of the target position based on the calculated distance.

That is, if the distance between the vehicle 10 and an obstacle which is at the front side of the vehicle 10 is different from the distance between the vehicle 10 and an obstacle which at the rear side of the vehicle 10, it is determined that the vehicle 10 is off the center of the target position.

If the vehicle 10 is off the center of the target position, the controller 130 controls steering of the vehicle 10 to position the vehicle 10 at the center of the target position.

While controlling steering of the vehicle 10, the controller 130 may guide shift to the forward gear or reverse gear of the vehicle 10 through the interface 150.

A message to guide shift to the forward gear or reverse gear may be displayed through the display, or may be output through a speaker in the form of voice.

Figure 6:
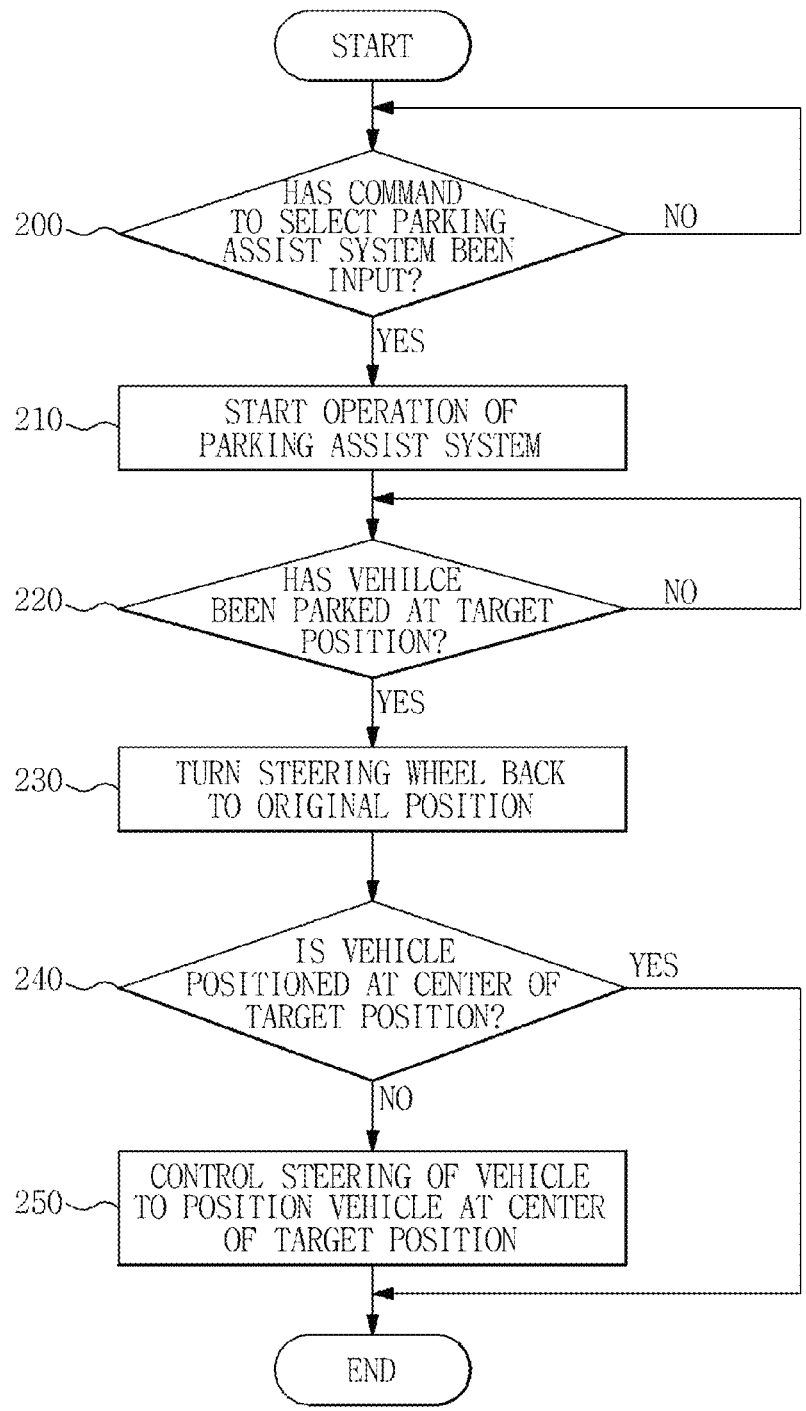
FIG. 6 is a flowchart illustrating a control method of the parking assist system according to the embodiment of the present invention.

FIG. 6 is a flowchart illustrating a control method of the parking assist system according to the illustrated embodiment of the present invention.

Referring to FIG. 6, when a command to select the parking assist system, i.e., a command to turn on the parking assist system is input by a driver (200), the parking assist system starts to operate (210).

After being turned on, the parking assist system determines whether the vehicle 10 is parked at a target position (220). When the vehicle 10 reaches the target position, the parking assist system turns the steering wheel of the vehicle 10 back to an original position (230).

Parking at the target position is performed in the same process as described above with reference to FIGS. 2 to 4.

The steering wheel is turned to its original position since forward or reverse movement of the vehicle 10 with the steering wheel turned to one side may prevent the vehicle 10 from being placed at the center of the target position.

Once the steering wheel is turned back to its original position, whether the vehicle 10 is positioned at the center of the target position is determined (240).

According to the sensed result from the obstacle sensor 120, the distances between the vehicle 10 and other vehicles positioned at the front and rear sides of the vehicle 10, and based on the calculated distances, whether the vehicle 10 is positioned at or off the center of the target position is determined.

That is, if the distance between the vehicle 10 and a vehicle positioned at the front side of the vehicle 10 is different from the distance between the vehicle 10 and another vehicle positioned at the rear side of the vehicle 10, it is determined that the vehicle 10 is off the center of the target position.

If the vehicle 10 is off the center of the target position, steering of the vehicle 10 is controlled such that the vehicle 10 is positioned at the center of the target position (250).

While steering of the vehicle 10 is being controlled, shift to the forward gear or reverse gear of the vehicle 10 may be guided through the interface 150. A message to guide shift to the forward gear or reverse gear may be displayed through the display, or may be output through a speaker in the form of voice.

As is apparent from the above description, a parking assist system according to one embodiment of the present invention may assist a driver in parking a vehicle at the center of a target position, allow the driver to leave the parking position without additional adjustment of the position of the vehicle, and secure a space needed to load and unload the vehicle.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A parking assist system comprising:
   a state sensor to sense a state of a vehicle;
   an obstacle sensor to sense obstacles present at a front side, a rear side or lateral sides of the vehicle;
   an interface to provide a driver with information about a state or operation of the vehicle; and
   a controller to compute a parking path for the vehicle based on results of sensing by the state sensor and the obstacle sensor, control steering of the vehicle such that the vehicle is parked at a target position along the computed parking path, and announce, to the driver, manipulations required during parking of the vehicle at the target position, through the interface,
   wherein, when the vehicle reaches the target position, the controller controls steering of the vehicle to position the vehicle at a center of the target position, based on information related to situations at the front and rear sides of the vehicle sensed by the obstacle sensor,
   wherein, when the vehicle reaches the target position, the controller turns a steering wheel of the vehicle back to an original position thereof, calculates distances between the vehicle and the obstacles positioned at the front side and the rear side of the vehicle based on the result of sensing by the obstacle sensor when the steering wheel is turned back to the original position, determines whether the vehicle is off the center of the target position based on the calculated distances, and controls steering of the vehicle to position the vehicle at the center of the target position if the vehicle is off the center of the target position.

2. The parking assist system according to claim 1, wherein, if the distance between the vehicle and one obstacle positioned at the front side of the vehicle is different from the distance between the vehicle and another obstacle positioned at the rear side of the vehicle, the controller determines that the vehicle is off the center of the target position.

3. The parking assist system according to claim 1, wherein, when controlling steering of the vehicle to position the vehicle at the center of the target position, the controller guides the driver to perform shift to a forward or reverse gear through the interface.

4. The parking assist system according to claim 1, wherein the state sensor comprises at least one of a steering angle sensor to sense a steering angle of the vehicle, a gear position sensor to sense a position of a gear, a wheel speed sensor to sense a wheel speed of the vehicle, and a vehicular speed sensor to sense a speed of the vehicle.

5. The parking assist system according to claim 1, wherein the obstacle sensor comprises an ultrasonic sensor to sense distances to the obstacles.

6. A control method of a parking assist system including a state sensor to sense a state of a vehicle, an obstacle sensor to sense obstacles present at a front side, a rear side or lateral sides of the vehicle, and an interface to provide a driver with information about a state or operation of the vehicle, the control method comprising:
   computing a parking path for the vehicle based on results of sensing by the state sensor and the obstacle sensor;
   controlling steering of the vehicle such that the vehicle is parked at a target position along the computed parking path; and
   when the vehicle reaches the target position, controlling steering of the vehicle to position the vehicle at a center of the target position based on information related to situations at the front and rear sides of the vehicle sensed by the obstacle sensor.

7. The control method according to claim 6, wherein the controlling based on the information related to the situations at the front and rear sides of the vehicle comprises:
   when the vehicle reaches the target position, turning a steering wheel of the vehicle back to an original position thereof;
   when the steering wheel is turned back to the original position, calculating distances between the vehicle and the obstacles positioned at the front side and the rear side of the vehicle based on the result of sensing by the obstacle sensor;
   determining whether the vehicle is off the center of the target position based on the calculated distances; and
   if the vehicle is off the center of the target position, controlling steering of the vehicle to position the vehicle at the center of the target position.

8. The control method according to claim 7, wherein the determining comprises determining that the vehicle is off the center of the target position if the distance between the vehicle and one obstacle positioned at the front side of the vehicle is different from the distance between the vehicle and another obstacle positioned at the rear side of the vehicle.

9. The control method according to claim 7, further comprising guiding the driver to perform shift to a forward or reverse gear through the interface, while controlling steering of the vehicle to position the vehicle at the center of the target position.

* * * * *